United States Patent Office 3,544,335
Patented Dec. 1, 1970

3,544,335
COATED FROZEN BATTER PIECES AND
PROCESS FOR MAKING SAME
Robert F. Kozlik, Minneapolis, Minn., assignor to General
Mills, Inc., a corporation of Delaware
No Drawing. Filed July 3, 1967, Ser. No. 650,630
Int. Cl. A21d 13/08
U.S. Cl. 99—92                                    5 Claims

ABSTRACT OF THE DISCLOSURE

A chemically leavened, shortened batter which is made up of a plurality of frozen discrete pieces, each completely encapsulated within an aqueous coating which is frozen solid at the highest temperatures common to home freezers or refrigerator-freezer compartments.

---

The product of my invention consists of a batter which is made up of a plurality of discrete pieces with these pieces being at least partially frozen. The pieces which comprise the batter are made up of a batter fraction or aliquot and an aqueous coating which is frozen solid at the highest temperatures common to home freezers, or refrigerator-freezer compartments, i.e., 15–20° F.

Cake batter made in such a way has many advantages for the consumer. If the consumer wants to bake a cake she merely combines a number of pieces into a cake pan and bakes. No thawing prior to use by the consumer is necessary. The consumer may use only part of a package to produce a small cake which would not stale before being eaten. Conventional cake mixes are designed for the production of full sized cakes and are not easily adapted to making a small cake or small number of cupcakes. Also because the consumer can use small amounts of these pieces, she can always have a supply of batter on hand. Furthermore, there is no need for blending, mixing or any of the other steps required for making a cake from conventional cake mixes. Pancakes may be coated and frozen and preparation would require removing from the freezer and placing on the griddle. Pancakes could be packaged, stacked, and the homemaker would need only to remove the amount desired, and leave the balance in the freezer.

Another variation on the use of our invention would be making a batter by combining a batter piece or pieces containing a color different than other pieces which make up the batter. This could produce interesting pattern and color combinations.

To make the product of my invention, any conventional shortened batter may be used. By batter I means a combination of ingredients comprised of flour or other farinaceous material, water and leavening and which is relatively fluid and in addition may contain sugar, shortening and eggs in various proportions depending on the type of batter desired. By shortened batter I mean batter containing shortening examples of these batters are pound cake, brownie, pancake and layer cake. Excluded from this category are the cakes generally known in the art as foam cakes. Examples of these are angle food, sponge and chiffon. As a rule these cakes depend for their rise during baking on an air containing protein foam which would be substantially hindered or destroyed if shortening were present. The foam cakes will not rise well after baking if they have been made from encapsulated aliquots. We are not sure as to why this happens but we believe that the presence of the added moisture from the coating during the initial stages of baking tend to weaken the cellular structure of the foam wall.

Batters used for the production of the frozen aliquots may be made from any of the commonly available commercial mixes or by combining the ingredients desired following any commonly available cookbook recipe. These batters must not be yeast leavened, however. Yeast-leavened batters require proofing. Proofing would mean thawing the pieces which is time consuming and would therefore be disadvantageous to the batter's intended use as a convenience product.

Flavoring material of a wide variety can be used in the batter for the production of delicious cakes. Flavors and flavoring material such as nuts, chocolate and other ingredients commonly found in cake mixes can be used. Also, because of the fact that the cake made from the batter comes from frozen batter pieces rather than the standard dry mixes, flavoring ingredients containing moisture at relatively high levels can be used. Dry mixes usually have only dry ingredients because of problems encountered in packaging and the danger of spoilage of the moist ingredients when stored at room temperature. Because the batter pieces of our invention are frozen, such high moisture ingredients as fresh fruit or fruit puree may be used by inclusion within the batter piece or by being frozen as a discrete piece and included within the package.

The batter piece of our invention must not contain a batter aliquot greater than 1½ inches in thickness or it will produce a cake which is brown on the outside without being thoroughly baked in the center. Very thin aliquots, those less than ¼ inch, are relatively fragile and are therefore more difficult to work with when the preferred method for making our product is utilized. Also, similar sized thin aliquots have more surface area than the thicker aliquots. To use uncoated, frozen aliquots with ease, the coating. We prefer a range of thickness of about ¼ to 1¼ inches to avoid the problems encountered from relatively thick or thin aliquots.

Although most of the advantages mentioned above accrue to a batter made up of frozen batter aliquots which have not been coated, there is one problem with such aliquots. To use uncoated, frozen aliquots with ease, the aliquots must be frozen solid. If they are not completely solidly frozen, the aliquots first become sticky on the surface and cohere to each other thus making handling and measuring difficult and as a result, decreasing the versatility of the batters made from these aliquots. If the aliquots become somewhat fluid after the initial surface melting described above, they are no longer discrete segments but become merely a conventional liquid batter with all of the problems in preservation, use and storage associated therewith. Since batters are not solidly frozen at temperatures of 32° F. and generally may not solidly freeze at normal household freezer temperatures, practical use of frozen batter aliquots by the housewife may be limited. Another aspect of this problem with ordinary solid aliquots of batter is the time involved in transporting the batter from the grocery freezer to the home freezer. Even aliquots which will not melt either on the surface or completely at home freezer temperature may do so during transit from the grocery to home freezer. This undesirable melting could be prevented to some extent by heavily insulated packages but this is expensive and may not be completely successful.

By encapsulating the batter aliquots within an aqueous coating, I have provided an effective, inexpensive insulator that is compatible with all of the above mentioned advantages inherent in a solidly frozen batter aliquot. Ice, of course, melts at about 32° F. If the ice completely encloses the batter aliquot, the aliquot may be either in a liquid or solid state without any danger of them cohering to one another. Frozen batters which undergo complete or surface melting at temperatures below the melting point of ice can now be utilized as if they were still frozen. Since ice will not melt at temperatures common to a home freezer, there is no problem with partially thawed pieces. Also, as mentioned previously, ice acts as an insulator so that if the batter fraction would normally melt if exposed to a temperature of say 5° F. for 5 minutes, it will now take temperatures of 20° F. for 5 minutes to melt the batter.

The batter piece of my invention may be made by a variety of ways such as freezing ice to produce a hollow cavity, injecting the batter into the cavity and freezing the hole made by the injection or two hollowed ice forms such as hemispheres may be frozen together with the batter portion being present in one form prior to the joining of the forms. Although many methods are possible for the production of our invention, the one we most prefer is to freeze the batter into discrete aliquots and then coat the solid batter aliquots with an aqueous solution. Due to the low temperature of the frozen batter portion, i.e., aliquot, the water will freeze generally in less than 30 seconds when brought into intimate contact with the pieces. Coating may be done by spraying, dipping or any of the other means well known to the art for applying a liquid material to a solid.

If the batter aliquots are to be frozen as in our preferred procedure, an edible batter aliquot adhesive must be mixed with the water to enable the water to completely coat the surface of the frozen batter. The edible batter aliquot adhesive substance which will hereafter be called a batter adhesive is needed to help the water provide a complete, adherent, relatively uniform coating. When the batter is frozen as discrete aliquots, the surface becomes somewhat slick and if water alone is added, it has a tendency to run off and also not completely cover the corners of the piece. With the presence of a batter adhesive, the water adheres to the frozen piece and completely coats it.

A great variety of materials can be used as the batter adhesive agent. Examples of some of the materials which will produce this adhesive action are pregelatinized starch, vegetable gums such as guar and carrageenin, cellulosic derivates such as carboxymethylcellulose (C.M.C.), lecithin, easily water-dispersible mono, di and tri glyceride containing emulsifiers such as atmul 80 which is known in the trade as a "soft mono" and contains 40 to 50% monoglycerides, a maximum of 1.0% free fatty acid and glycerine; has an iodine value of 62 to 72 and a peroxide value (m.eq./1000 g.) not exceeding 1.0% or other emulsifiers such as polyoxyethylene sorbitanmono-oleate (Tween 80). Pectins have also been used successfully. Obviously, because of the wide variety of types of substances which will serve successfully as an adhesive, the above examples are merely illustrative and should in no way be considered exclusive because those skilled in the art could derive many variations from the groups listed above.

The batter adhesive need be added in extremely small amounts to be effective. Any addition at all of these adhesives will provide some help and providing complete encapsulation the amount added will, of course, vary with the adhesive chosen. Some adhesives such as C.M.C. or the vegetable gums are strongly adherent at low levels but may produce uncommon flavors in a cake when used at relatively high levels. Others such as pregelatinized starch are less adhesive but produce no uncommon flavors when present in a cake so higher levels for the batter may be used or, indeed, preferred.

Although any level of addition of the batter adhesive will help, we have found that a level of 0.1% by weight of the batter piece will provide enough adhesion to produce a complete coating with the adhesives listed above.

The frozen coating fraction may be made of any thickness. It need only completely cover the batter aliquot to prevent them from sticking together. Thicker coatings may, of course, be used to add structural strength to the pieces. When the cake is baked using coated batter aliquots, there are thin lines present on the upper crust showing the location of the pieces as originally placed; a scattering of thin lines throughout the interior portion of the cake is also apparent. While these lines are not objectionable and produce no difference in mouth feel when the cake is eaten, it is believed that they are present because of the coating and will become larger as the coating thickness increases. It is believed, further, that if very thick coatings were used, there would be some weakening of the "weld" or connection along the points of contact (as evidenced by these lines) of the pieces when they are baked. This might, we believe, affect the overall structural rigidity of a cake made from these pieces. For this reason we prefer to keep the coating thick enough to completely coat the product although much thicker coatings can be made if desired.

The process of our invention consists of freezing aliquots of batter into solid discrete pieces, completely coating the solid pieces with an aqueous solution containing an edible batter aliquot adhesive and freezing the coating to the aliquot. Freezing of the batter fraction may be done in a tunnel freezer with the batter in molds or in slabs, by dropping the fraction into a liquid coolant such as liquid nitrogen or by any other conventional means. The frozen batter aliquot, as previously mentioned, must not exceed 1½ inches in thickness. Coating may be done by immersion of the solid batter aliquots in the coating solution, by spraying the coating solution over the surface of the batter aliquots or by any other means commonly known in the art for applying a coating in liquid form to a solid.

Freezing of the coating to the batter aliquot is carried on in a cold environment and the aliquot itself draws heat so rapidly from the coating that the coating is frozen solid in a matter of seconds.

Examples of the product of our invention follow.

EXAMPLES 1–5

For Examples 1–5 a white layer cake batter was made according to the recipe given below. The cake ingredients were:

2¼ cups cake flour
1½ cups sugar
3½ tsp. baking powder
1 tsp. salt
½ cup soft shortening
1 cup milk
1 tsp. flavoring
4 egg whites.

The flour, sugar, baking powder and salt were blended followed by shortening, ⅔ cup of milk and flavoring. The mixture was beaten in a mixer for 2 minutes at medium speed with the sides of the bowl being scraped constantly. The rest of the milk and the egg whites were then added and the mixture was beaten as before for 2 minutes. The batter was then poured into 1¼ x 1¼ inch molds and frozen. The freezing of the batter was done by using a baker's sheet with a 1 inch covering of Dry Ice as a freezing platform and placing the molds on top of the ice. Aluminum foil was then placed on top of the molds and ground Dry Ice was sprinkled on the foil with the overall effect simulating a freezing tunnel. The aliquots took about 14–16 minutes to freeze solidly.

The frozen aliquot (1¼ x 1¼ x 1 inch) was then immersed in an aqueous liquid coating solution. The coated aliquot, i.e., the piece was removed from the coating solution and the excess coating adhering to the piece was removed by a blower. The piece was then cooled to a temperature below the melting point of the coating. The entire coating operation was done in a matter of seconds.

The table below indicates some of the batter adhesives which were used and the levels tested:

| | Batter adhesive | Percent by weight of water |
|---|---|---|
| Example No.: | | |
| 1 | Soft mono (Atmul 80) | 0.1, 6.0 |
| 2 | Carrageenin | 0.1, 5.0 |
| 3 | Guar | 0.1, 4.0 |
| 4 | C.M.C. | 0.1, 1.0 |
| 5 | Pectin | 0.1, 5.0 |

The baking conditions for the frozen pieces was from 35–40 minutes at 350° F. as compared to 30–40 minutes at 350° F. for the unfrozen batter prepared from the above recipe. Variances in baking times are dependent on the size and shape of the container, the level of batter in the container and the oven.

For Examples 6, 7, 8 and 9 a commercially available white cake mix was used as the basis for a batter. According to the package, the mix contained sugar, cake flour (bleached), shortening (with freshness preserver), non-fat dry milk, leavening, propylene glycol monoesters and mono and diglycerides, wheat starch, salt, artificial flavor, guar gum and soy lecithin.

The batter was then prepared according to the directions on the package which were as follows: blend cake mix, 1⅓ cups of water, 2 egg whites; beat for 4 minutes at medium speed with frequent scraping of the sides of the bowl. Freezing, coating and baking were carried out as in Examples 1–5. Baking time was 35–45 minutes for the frozen pieces as compared to 30–40 minutes for the unfrozen batter as specified on the cake mix package. For Example 5, C.M.C. was used to illustrate the fact that the same coating at the same level may be used on cakes made from a mix or from a cookbook.

| | Batter adhesive | Percent by weight of water |
|---|---|---|
| Example No.: | | |
| 6 | C.M.C. | 0.1, 1.0 |
| 7 | Pregelatinized starch | 0.1, 4.0 |
| 8 | Polyoxyethylene sorbitan mono-oleate (Tween 80) | 0.1, 2.0 |
| 9 | Lecithin | 0.1, 2.0 |

The coating thickness was measured by chipping off the top portion and using a micrometer to measure the difference between the thickness of the coating surrounding the aliquot and the thickness of the aliquot plus the bottom layer of coating. The measurements were believed to be rather inexact but they indicated that the thickness was between about .003 and .005 inch. Obviously the coatings can be made thicker for greater structural strength of the piece or thinner by spraying which is more exact or by increasing the velocity and/or amount of air blown across the piece after dipping. The coating must be thick enough to prevent contact of the batter portions but not so thick as to weaken the structure of the cake made from these pieces. The measurements given are merely to indicate one coating thickness which falls within this range.

EXAMPLE 10

A yellow layer cake batter was made according to the recipe below. The cake ingredients were:

2¼ cups cake flour
1½ cups sugar
3 tsp. baking powder
1 tsp. salt
½ cup soft shortening
1 cup milk
1½ tsp. flavoring
2 eggs.

The flour, sugar, baking powder and salt were blended followed by shortening, ⅔ cup of milk and flavoring. The mixture was beaten in a mixer for 2 minutes at medium speed with the bottom and sides of the bowl being scraped constantly. The rest of the milk and the eggs were then added and the mixture was beaten as before for 2 minutes scraping the bowl frequently. The aliquots were frozen according to the procedure outlined in Example 1 and in the same size molds. They were broken up into four irregularly shaped pieces about ½ inch thick and coated as in Example 1 with 0.1% C.M.C. and the coating was frozen as in Example 1. The adiquots took about 15–25 minutes to freeze. The cakes were then baked at 350° F. for 35–45 minutes.

EXAMPLE 11

A fudge cake batter was made according to the recipe below. The cake ingredients were:

1¾ cups cake flour
2 cups sugar
2 tsp. baking powder
¼ tsp. soda
1 tsp. salt
¼ cup soft shortening
1½ cups milk
1 tsp. vanilla
2 eggs
4 oz. melted unsweetened chocolate
1 cup chopped nuts.

The flour, sugar, baking powder, soda and salt were blended followed by shortening, milk and vanilla. The mixture was beaten in a mixer for 2 minutes at medium speed with the sides and bottom of the bowl being scraped constantly. The eggs and chocolate were then added and the mixture was beaten as before for 2 minutes scraping the bowl frequently. The nuts were added to the batter by stirring. The freezing of the aliquots, their subsequent breaking, coating, and freezing of the coating to the aliquots were carried out according to the procedure outlined in Example 10. The aliquots took from about 15–25 minutes to freeze. The cake was then baked at 350° F. for 50–55 minutes.

EXAMPLE 12

A pound cake batter was made according to the recipe below. The cake ingredients were:

2¼ cups cake flour
1 cup sugar
2 tsp. baking powder
1 tsp. salt
½ cup soft shortening
1 tsp. vanilla
5 egg yolks (⅜ cup) unbeaten
¾ cup milk.

The flour, sugar, baking powder and salt were blended followed by shortening, vanilla, egg yolks and ½ cup of milk. The mixture was beaten in a mixer for 2 minutes at medium speed with the bottom and sides of the bowl being scraped constantly. The rest of the milk was added and the mixture was beaten as before for 2 minutes scraping the bowl frequently. The freezing of the aliquots, their subsequent breaking, coating, and freezing of the coating to the aliquots were carried out according to the procedure outlined in Example 10. The aliquots took between about 15–25 minutes to freeze. Baking was done at 350° F. for 75–85 minutes.

When the cakes made from the frozen, coated batter of Examples 1–12 were compared with the comparable batter and recipe cakes organoleptically, there was little noticeable difference between the two when levels of 0.1% of the batter was used. For the adhesive agents listed, amounts used as the highest of the values listed for each agent resulted in a cake having a flavor from the adhesive which exceeded the flavor threshold level of at least some people. Of the adhesives tested, pregelatinized starch had the poorest adhesive properties but the least noticeable flavor when used at high levels.

The examples above are merely illustrative of the teachings of my invention and many variations will occur to those skilled in the art for the application of the teachings set forth herein.

Now, therefore, I claim:

1. A chemically leavened, shortened batter comprised of a plurality of frozen batter pieces, each having a thickness between about ¼ inch and 1½ inches and each completely encapsulated within an aqueous coating, said coating being frozen solid between 15 and 32° F. and being effective to reduce the tendency of the frozen batter pieces to stick together.

2. The batter of claim 1 where the pieces have a thickness between about ¼ and 1¼ inches.

3. The batter of claim 1 where the aqueous coating contains an edible batter adhesive to help bind and uniformly coat the pieces when the coating is applied to the pieces after the same are frozen.

4. The batter of claim 1 where at least one batter piece contains at least one color not present in another batter piece.

5. A process for making a coated, chemically leavened, shortened batter which comprises freezing the batter into a plurality of solid pieces, coating said pieces with an aqueous solution containing an edible batter adhesive and freezing said coating to said frozen pieces.

References Cited

UNITED STATES PATENTS 2,810,650  10/1957  Joslin _____ 99—92 XR
3,059,442  10/1962  Ellis _____ 99—192 UXR LIONEL M. SHAPIRO, Primary Examiner J. R. HOFFMAN, Assistant Examiner U.S. Cl. X.R.

99—192

PO-1050
(5/69)

UNITED STATES PATENT OFFICE
CERTIFICATE OF CORRECTION

Patent No. 3,544,335     Dated December 1, 1970

Inventor(s) Robert F. Kozlik

It is certified that error appears in the above-identified patent and that said Letters Patent are hereby corrected as shown below:

Column 1, line 52, "means" should read --mean--; line 58, "shortening examples" should read --shortening. Examples--; line 61, "angle" should read --angel--. Column 2, line 35, "aliquots. To use uncoated, frozen aliquots with ease, the" should read --aliquots and therefore will require a larger amount of--. Column 5, line 5, "Better adhesive" should read --Batter adhesive--. Column 6, line 9, "adiquots" should rea --aliquots--; line 25, "unsweeted" should read --unsweetened- Signed and sealed this 29th day of June 1971.

(SEAL)
Attest:

EDWARD M. FLETCHER, JR.
Attesting Officer

WILLIAM E. SCHUYLER, JF
Commissioner of Patents